United States Patent
Diepstraten et al.

(10) Patent No.: US 11,274,991 B2
(45) Date of Patent: Mar. 15, 2022

(54) FIBER OPTIC FERRULE INSPECTION TOOL

(71) Applicant: COMMSCOPE TECHNOLOGIES LLC, Hickory, NC (US)

(72) Inventors: Patrick Jacques Ann Diepstraten, Heusden-Zolder (BE); Jozef Christiaan Mathieu Versleegers, Bree (BE); Antonius Bernardus Gerardus Bolhaar, Ophemert (NL); Christiaan Radelet, Aarschot (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/260,837

(22) PCT Filed: Jul. 16, 2019

(86) PCT No.: PCT/US2019/041968
§ 371 (c)(1),
(2) Date: Jan. 15, 2021

(87) PCT Pub. No.: WO2020/018514
PCT Pub. Date: Jan. 23, 2020

(65) Prior Publication Data
US 2021/0270695 A1   Sep. 2, 2021

Related U.S. Application Data

(60) Provisional application No. 62/699,515, filed on Jul. 17, 2018.

(51) Int. Cl.
*G01M 11/00* (2006.01)
*G01M 11/08* (2006.01)
(Continued)

(52) U.S. Cl.
CPC .......... *G01M 11/31* (2013.01); *G01M 11/088* (2013.01); *G01N 21/952* (2013.01); *G02B 6/385* (2013.01); *G02B 6/3866* (2013.01)

(58) Field of Classification Search
CPC .. G02B 27/0006; G02B 21/0016; G02B 6/32; G02B 6/381; G02B 6/385; G02B 6/3866;
(Continued)

(56) References Cited

U.S. PATENT DOCUMENTS 5,140,167 A * 8/1992 Shaar .................. G01B 11/26
250/559.22
5,179,419 A * 1/1993 Palmquist ............ G02B 6/3843
356/73.1
(Continued)

FOREIGN PATENT DOCUMENTS

EP   1956356 A1 * 8/2008 ............ G01M 11/31
JP   6034758 B2   11/2016
(Continued)

OTHER PUBLICATIONS

International Search Report and Written Opinion of the International Searching Authority for International Patent Application No. PCT/US2019/041968 dated Nov. 5, 2019, 11 pages.

*Primary Examiner* — Gordon J Stock, Jr.
(74) *Attorney, Agent, or Firm* — Merchant & Gould P.C.

(57) ABSTRACT

An inspection tool for allowing visual inspection of an end face of a fiber optic ferrule. The inspection tool includes a passage for allowing a camera to view the end face. The inspection tool also includes light directing structure for first directing ferrule illumination light axially along the inspection tool, and then reflecting the axial light across the end face of the fiber optic ferrule.

16 Claims, 8 Drawing Sheets

(51) Int. Cl.
*G02B 6/38* (2006.01)
*G01N 21/952* (2006.01)

(58) Field of Classification Search
CPC ... G02B 6/423; G02B 6/4292; G01M 11/088; G01M 11/30; G01M 11/31; G01M 11/331; G01M 11/33; G01M 11/332; G01M 11/333; G01M 11/335; G01M 11/336; G01M 11/337; G01M 11/338; G01N 2021/8822; G01N 2021/8825; G01N 2021/9511; G01N 21/88; G01N 21/8803; G01N 21/8806; G01N 21/94; G01N 21/95; G01N 21/9515; G01N 21/952; G01N 21/958
See application file for complete search history.

(56) References Cited

U.S. PATENT DOCUMENTS

| | | | |
|---|---|---|---|
| 5,724,127 | A | 3/1998 | Cspikes et al. |
| 7,264,402 | B2 | 9/2007 | Theuerkorn et al. |
| 8,988,670 | B2 * | 3/2015 | Zhou ............... G01M 11/31 356/73.1 |
| 9,019,486 | B2 * | 4/2015 | Kim ............... G01M 11/31 356/73.1 |
| 9,841,567 | B1 * | 12/2017 | Zhou ............... G02B 6/385 |
| 9,921,373 | B2 * | 3/2018 | Nadeau ........... G01M 11/3154 |
| 11,022,760 | B2 * | 6/2021 | Brown ............. G06T 7/0004 |
| 11,099,331 | B2 * | 8/2021 | Lee ............... G01M 11/088 |
| 2004/0156099 | A1 * | 8/2004 | Cassady .......... G02B 21/0016 359/368 |
| 2014/0327735 | A1 | 11/2014 | Ruchet et al. |
| 2015/0116699 | A1 * | 4/2015 | Meek ............... G01M 11/31 356/73.1 |
| 2015/0116700 | A1 * | 4/2015 | Meek ............... G01M 11/088 356/73.1 |
| 2016/0341904 | A1 | 11/2016 | Morin-Drouin et al. |
| 2017/0102288 | A1 * | 4/2017 | Schell ............. G01M 11/31 |

FOREIGN PATENT DOCUMENTS

| | | |
|---|---|---|
| KR | 10-1572858 B1 | 11/2015 |
| WO | 2017/058629 A1 | 4/2017 |
| WO | 2018/009802 A1 | 1/2018 |

* cited by examiner

FIBER OPTIC FERRULE INSPECTION TOOL

CROSS-REFERENCE TO RELATED APPLICATION

This application is a National Stage Application of PCT/US2019/041968, filed on Jul. 16, 2019, which claims the benefit of U.S. Patent Application Ser. No. 62/699,515, filed on Jul. 17, 2018, the disclosures of which are incorporated herein by reference in their entireties. To the extent appropriate, a claim of priority is made to each of the above referenced applications.

TECHNICAL FIELD

The present disclosure relates generally to tools and methods for inspecting the end faces of fiber optic ferrules.

BACKGROUND

In the field of fiber optic telecommunications, there is a need to optically connect various optical fibers together to complete optical circuits. The optical fibers are often optically connected together using optical connections provided by fiber optic connectors. It is common for fiber optic connectors to include fiber optic ferrules. Fiber optic ferrules are typically ceramic or plastic components configured to receive and support end portions of optical fibers. Fiber optic ferrules may each terminate a single optical fiber or may terminate a plurality of optical fibers. Examples of ferrules for use with single-fiber fiber optic connectors include SC ferrules and LC ferrules. An example of a ferrule commonly used with multi-fiber fiber optic connectors is an MPO ferrule. For many types of optical connections between fiber optic connectors, a fiber optic adapter is used to provide an interconnection between two fiber optic connectors. Typically, a fiber optic adapter includes opposite ports each configured for receiving a fiber optic connector. When the fiber optic connectors are inserted within the ports, the ferrules of the fiber optic connectors are aligned with one another so that the optical fibers secured within the ferrules of the fiber optic connectors connected by the fiber optic adapter are coaxially aligned with one another. Hardened fiber optic connectors have also been developed. Hardened fiber optic connectors are typically designed for outside environments and are therefore often sealed and have relatively high axial load capacities. In a hardened fiber optic connector, it is common for a ferrule to be housed inside the fiber optic connector so as to be shielded or shrouded by a portion or portions of the connector. Example hardened fiber optic connectors are disclosed by U.S. Pat. No. 7,264,402, which is hereby incorporated by reference in its entirety.

Optical connections formed between fiber optic ferrules terminating one or more optical fibers may be degraded if contamination and/or physical damage is present. For example, if the end face of one of the fiber optic ferrules is scratched, pitted, deformed, or otherwise damaged, the optical connection between the optical ferrule and mating fiber optic ferrule may be compromised. As another example, if dust, dirt, lint, debris or other contaminants are present between the pair of mated fiber optic ferrules, the optical connection between the mated fiber optic ferrules may be compromised.

To reduce the likelihood of a given fiber optic ferrule being compromised, inspection of the fiber optic ferrule may be performed. The inspection of the fiber optic ferrule may include visually inspecting the end face of the fiber optic ferrule for damage or for contamination. Patent Cooperation Treaty (PCT) Int'l Pub. No. WO2018/009802, which is hereby incorporated by reference in its entirety, discloses an example fiber optic ferrule inspection tool for inspecting the end faces of fiber optic ferrules. However, the ferrule end face inspection tool disclosed therein is primarily designed for use in the factory. Therefore, ferrule end face inspection tools suited for field use and for readily inspecting the end faces of fiber optic ferrules recessed within other fiber optic components such as within hardened fiber optic connector bodies or within fiber optic adapters are needed.

SUMMARY

On aspect of the present disclosure relates to an inspection tool for inspecting the end face of a fiber optic ferrule when the fiber optic ferrule is recessed within another fiber optic component such as a fiber optic adapter (e.g., an MPO fiber optic adapter) or a connector body (e.g., a connector body of a hardened female fiber optic connector). In certain examples, inspection tools in accordance with the principles of the present disclosure are ideally suited for use in the field.

Another aspect of the present disclosure relates to an inspection tool for inspecting the end face of a fiber optic ferrule. The inspection tool includes a first end adapted to receive the fiber optic ferrule desired to be inspected, and a second end adapted to be coupled to a camera having a light source. The inspection tool includes a first passage for allowing the camera to view/generate an image of the end face of the ferrule. The inspection tool also includes a passage for directing light from the camera through the inspection tool (e.g., axially through the inspection tool) to the first end of the inspection tool. The inspection tool further includes a light reflecting feature (e.g., a light reflecting surface, surfaces, facets, or other structures) for internally reflecting the light from the light conveying passage across the end face of the ferrule desired to be inspected. Preferably, the light is reflected at a grazing angle relative to the end face of the ferrule such that any debris or damage to the end face of the ferrule is readily illuminated when viewed by the camera. It will be appreciated that the inspection tool in accordance with the principles of the present disclosure can be used and can be made compatible with single-fiber fiber optic ferrules and multi-fiber fiber optic ferrules. In certain examples, the first end of the inspection tool can have a form factor adapted to be received within a fiber optic adapter such as an MPO fiber optic adapter, an LC fiber optic adapter or an SC fiber optic adapter. In other examples, the first end of the inspection tool can have a form factor suitable to be received within a fiber optic connector such as a female Optitip™ fiber optic connector.

Another aspect of the present disclosure relates to an inspection system for inspecting an end face of a fiber optic ferrule configured for supporting one or more optical fibers. The inspection system includes a camera having a light source. The camera has an imaging direction. The inspection system also includes an inspection tool having a length that extends along a tool axis between opposite first and second ends of the tool. The first end of the inspection tool defines a ferrule receptacle for receiving the fiber optic ferrule with the end face of the ferrule facing toward the second end of the tool and with the end face of the ferrule defining a ferrule reference plane. The second end of the tool is adapted to mount to the camera with the imaging direction of the camera extending toward the first end of the tool. The inspection tool defines an imaging passage for allowing the camera to image the end face of the fiber optic ferrule when the camera is mounted at the second end of the inspection tool and the fiber optic ferrule is received within the ferrule receptacle. The inspection tool also defines a light conveying passage positioned outwardly offset from the imaging passage for directing light from the light source of the camera to the first end of the inspection tool. The tool further includes a light reflecting surface at the first end of the inspection tool for reflecting the light from the light conveying passage across the ferrule receptacle in a light grazing orientation relative to the ferrule reference plane.

Another aspect of the present disclosure relates to an inspection system for inspecting an end face of a fiber optic ferrule configured to support one or more optical fibers. The inspection system includes a camera having a camera lens aligned along a lens axis. The camera lens faces in an imaging direction. The camera also includes a light source for directing light at least partially in the imaging direction. The inspection system further includes an inspection tool having a length that extends along a tool axis between opposite first and second ends of the tool. The first end of the inspection tool defines a ferrule receptacle intersected by the tool axis for receiving the fiber optic ferrule with the end face of the ferrule facing toward the second end of the inspection tool. The second end of the inspection tool is adapted to mount the camera with the imaging direction of the camera extending toward the first end of the tool and with the lens axis co-axially aligned with the tool axis. The tool includes an inner conduit defining an imaging passage that is aligned along the tool axis for allowing the camera to image the end face of the fiber optic ferrule when the camera is mounted at the second end of the inspection tool and the fiber optic ferrule is received within the ferrule receptacle. The inspection tool also includes an outer sleeve secured about the inner conduit such that a light conveying passage is defined between an outer surface of the inner conduit and an inner surface of the outer sleeve. The light conveying passage is configured to convey light from the light source of the camera at the second end of the inspection tool along the tool axis to the first end of the inspection tool. The inspection tool further includes a light reflecting surface at the first end of the inspection tool in alignment with the light conveying passage for reflecting the light from the light conveying passage across the end face of the fiber optic ferrule in a light grazing orientation relative to the end face of the fiber optic ferrule.

A variety of advantages of the disclosure will be set forth in part in the description that follows, and in part will be apparent from the description, or may be learned by practicing the aspects of the present disclosure. It is to be understood that both the forgoing general description and the following detailed description are exemplary and explanatory only and are not restrictive of the broad inventive concepts upon which the examples are based.

DETAILED DESCRIPTION

Aspects of the present disclosure relate to an inspection tool for facilitating the visual inspection of the end face of a fiber optic ferrule when the fiber optic ferrule is at a difficult to access location such as recessed within a fiber optic connector or recessed within a fiber optic adapter. In certain examples, the inspection tool includes a passage or window for allowing a camera to be used to view (e.g., image) the end face of a fiber optic ferrule under inspection while light is directed across the end face in a grazing orientation. In certain examples, the grazing orientation of the light can be oriented at an angle in the range of 0-30 degrees relative to the end surface/face of the ferrule. In certain examples, the grazing orientation can be an oblique angle relative to the end surface of the ferrule being inspected. In certain examples, the inspection tool includes a structure such as a passage for directing light in a generally axial direction from a light source to allow the light to be propagated to a side or to sides of an end face of a fiber optic ferrule being visually inspected. Once the light propagates to the location generally adjacent to the side or sides of the end face of the fiber optic ferrule being tested, the light is reflected in a radial direction by a reflection surface or surfaces so that the light is directed across the end face of the fiber optic ferrule being inspected preferably at a grazing angle relative to the end face. The light directed across the end face of the ferrule assists in illuminating contamination and imperfections provided on the end face which can be readily viewed by the camera through the viewing window. In certain examples, the camera can generate visual images depicting the end face of the ferrule with any contamination and/or imperfections illuminated by the grazing light.

Figure 1:
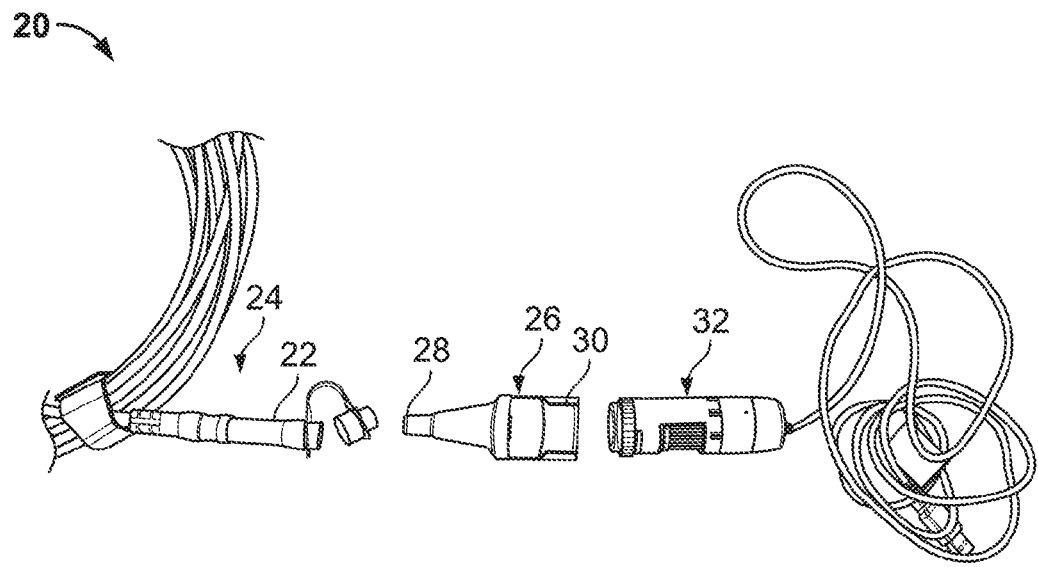
FIG. 1 illustrates an inspection system in accordance with the principles of the present disclosure for inspecting the end face of a fiber optic ferrule, the inspection system is compatible with a hardened, female fiber optic connector.
Figure 11:
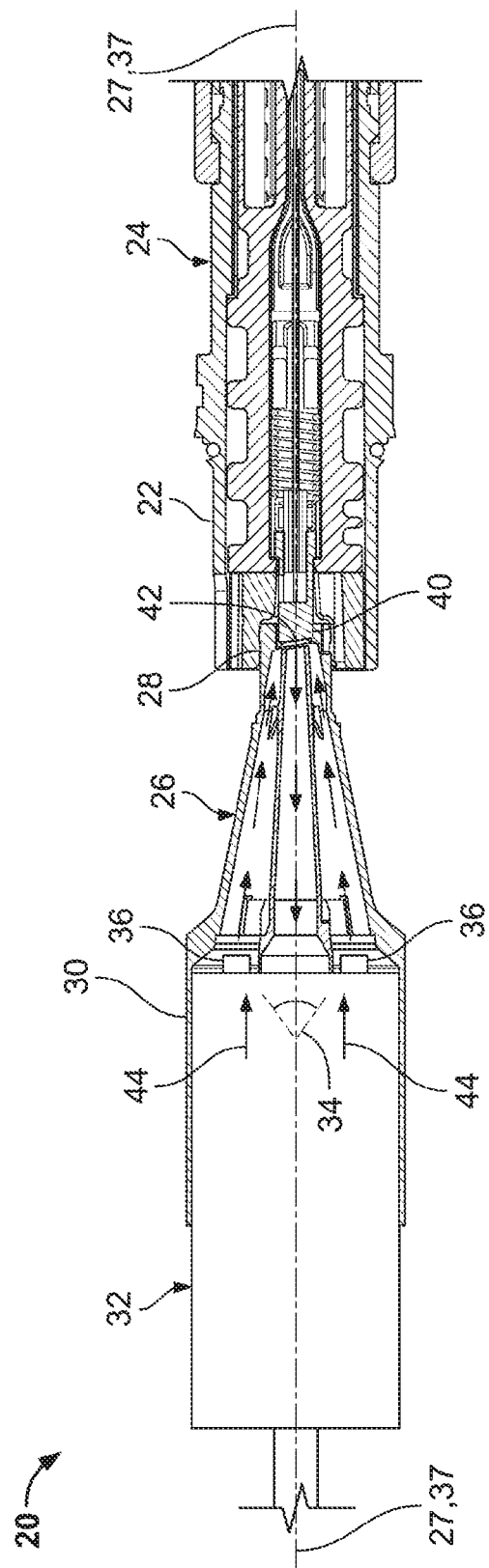
FIG. 11 is a longitudinal cross-sectional view of the inspection system of FIG. 3 with a tip of the inspection tool inserted within the hardened, female fiber optic connector.

FIG. 1 depicts an inspection system 20 in accordance with the principles of the present disclosure for inspecting the end face of a ferrule recessed within a connector body 22 of a hardened female multi-fiber fiber optic connector 24 (e.g., a female Optitip™ fiber optic connector). The inspection system 20 includes an inspection tool 26 having a first end 28 and an opposite second end 30. The inspection system 20 also includes a camera 32 having a lens 34 (see FIG. 11) and a light source 36 (see FIG. 11). Preferably, the light source 36 is positioned radially outside the lens 34 and in certain examples is configured to direct a ring of light that surrounds a central axis of the lens and the inspection tool in a generally axial direction through the inspection tool 26. The first end 28 of the inspection tool 26 is configured to fit within or mate within the connector body 22 and to receive the ferrule housed within the connector body 22. The second end 30 of the inspection tool 26 is configured to be coupled to the one end of the camera 32 such that the inspection tool 26 and the camera 32 are co-axially aligned. In certain examples, a central axis 27 of the camera 32 extending centrally through the lens 34 is co-axially aligned with a central axis 37 of the inspection tool 26. In certain examples, the central axis of the inspection tool 26 can extend through a central imaging passage defined by the inspection tool 26.

Figure 2:
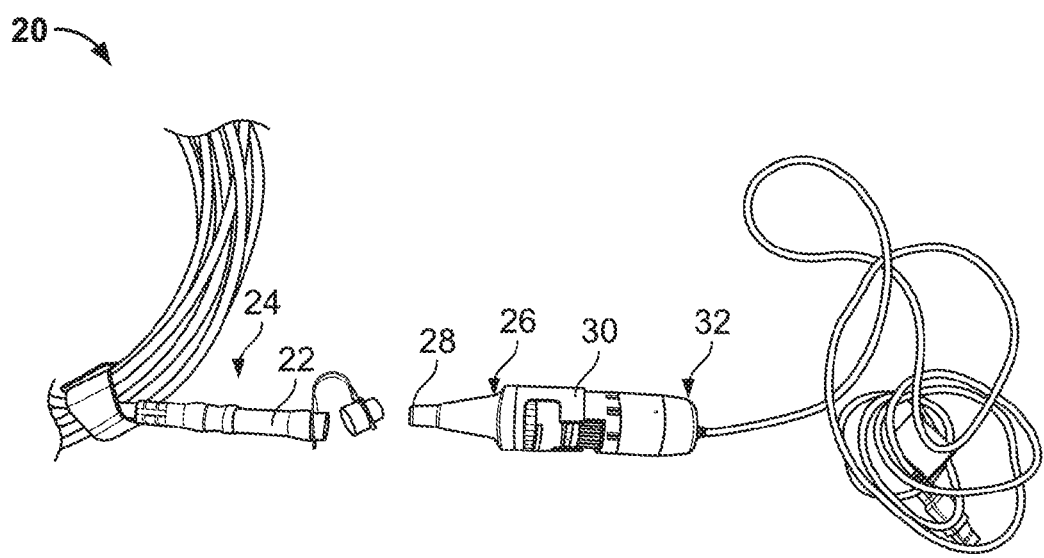
FIG. 2 shows the inspection system of FIG. 1 with an inspection tool of the inspection system mounted on a camera of the inspection system.
Figure 3:
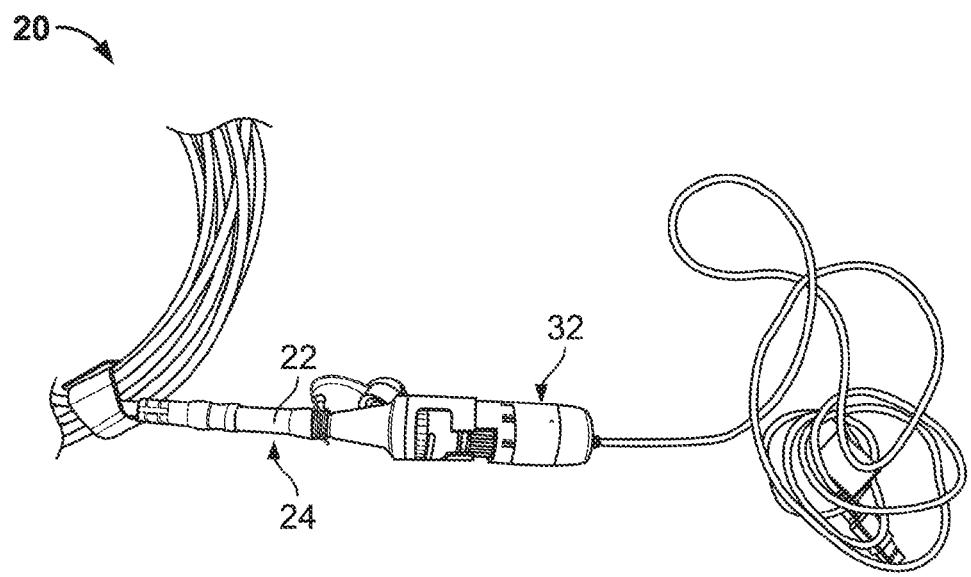
FIG. 3 shows the inspection system of FIG. 2 with a tip of the inspection tool mated within the hardened, female fiber optic connector so as to be in a position suitable for inspecting the end face of a fiber optic ferrule recessed within a housing of the hardened, female fiber optic connector.

FIG. 2 shows the second end 30 of the inspection tool 26 coupled to the camera 32, and FIG. 3 shows the first end 28 of the inspection tool 26 inserted within the connector body 22. When the first end 28 of the inspection tool 26 is inserted into the connector body 22 while the camera 32 is concurrently attached to the second end 30 of the inspection tool 26, the camera 32 can direct light in a generally axial direction through the inspection tool 26. The inspection tool 26 is configured to direct or guide the light to the general vicinity of the end face of the ferrule housed within the connector body 22. In certain examples, the light is directed to one or more sides of the end face of the ferrule. Adjacent the end face of the ferrule, the inspection tool 26 reflects the generally axially propagating light in a radial direction toward the central axis 37 of the inspection tool 26. Preferably, the light is reflected across the end face of the ferrule being tested with the reflected light being angled at a grazing angle relative to the end face. In certain examples, the grazing angle is 0-30 degrees relative to the ferrule end face. By directing light across the end face of the ferrule rather than directing the light directly axially at the end face of the ferrule, imperfections and contamination on the end face of the ferrule is more readily illuminated and more easily identified in images of the end face generated by the camera 32.

Figure 4:
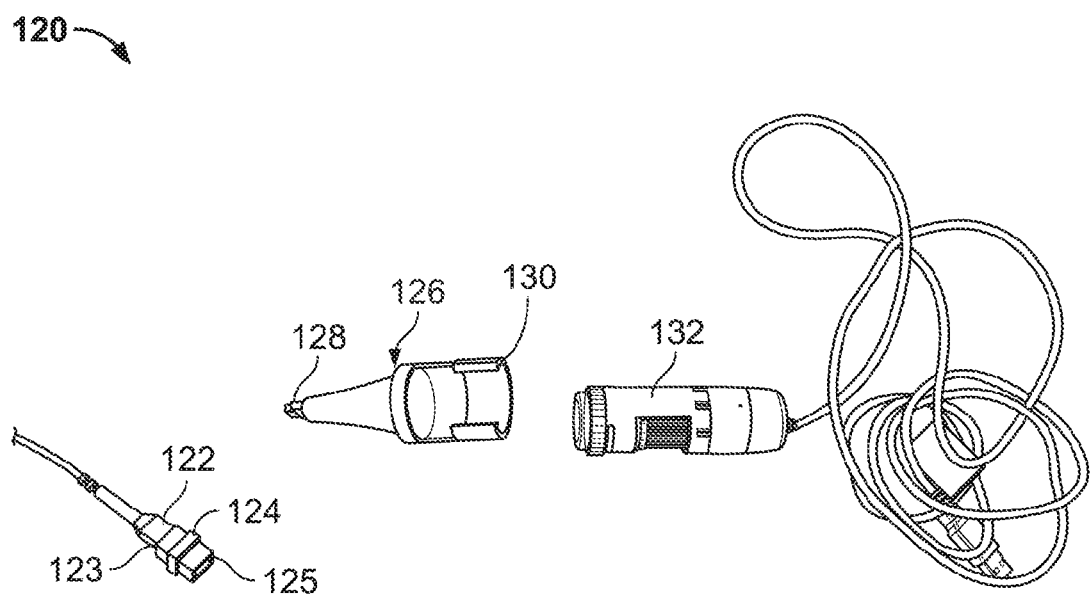
FIG. 4 illustrates another inspection system in accordance with the principles of the present disclosure, the inspection system is suitable for inspecting the end face of an MPO fiber optic ferrule while the MPO fiber optic ferrule is recessed within an MPO fiber optic adapter.
Figure 5:
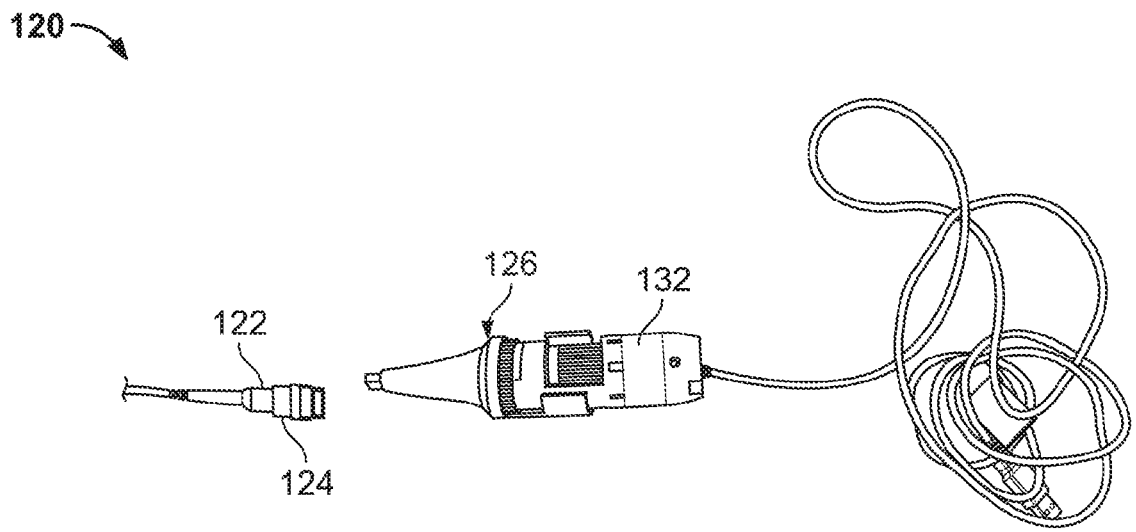
FIG. 5 shows the inspection system of FIG. 4 with an inspection tool of the inspection system mounted on a camera of the inspection system.
Figure 6:
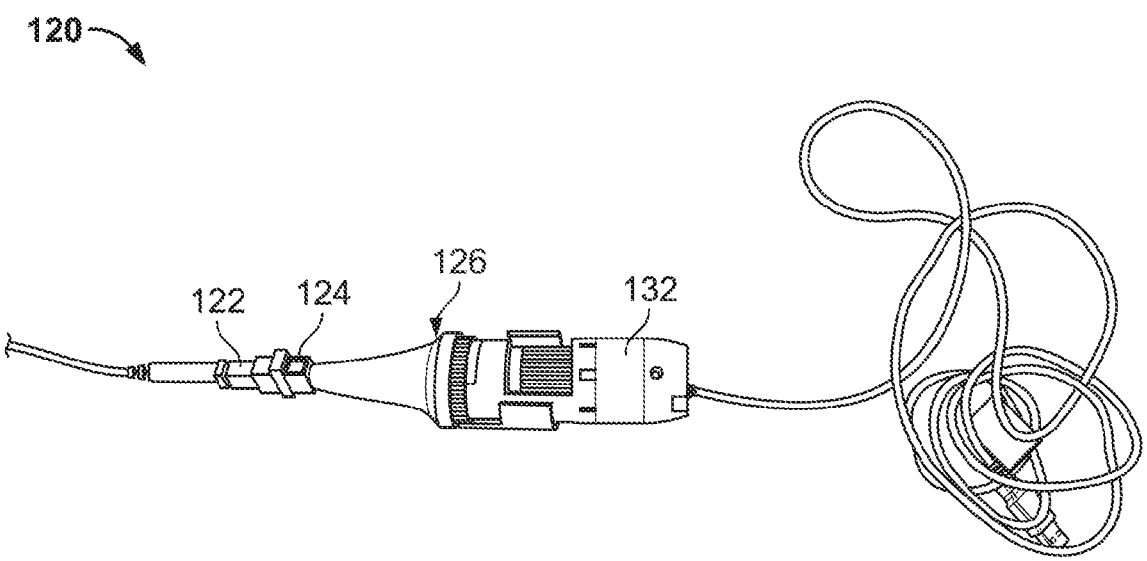
FIG. 6 shows the inspection system of FIG. 5 with a tip of the inspection tool inserted within a port of the MPO fiber optic adapter so as to be in a position to inspect an end face of an MPO ferrule corresponding to an MPO connector loaded within an opposite port of the MPO adapter.

FIG. 4 shows another inspection system 120 in accordance with the principles of the present disclosure. The inspection system 120 is adapted for facilitating the visual inspection of the end face of a multi-fiber ferrule integrated as part of a multi-fiber fiber optic connector such as an MPO connector 122. The end of the MPO connector 122 has been secured within a first port 123 of an MPO adapter 124. The inspection system 120 includes an inspection tool 126 having a first end 128 configured to fit within a second port 125 of the MPO adapter 124 such that the ferrule of the MPO connector 122 can be received within a receptacle at the tip of the inspection tool 126 while the MPO connector 122 remains inserted within first port 123 of the MPO adapter 124. It will be appreciated that the inspection system 120 also includes a camera 132 of the type previously described. FIG. 5 shows the inspection system 120 with the camera 132 attached to the second end 130 of the inspection tool 126. FIG. 6 shows the inspection system 120 ready to inspect the end face of the ferrule of the MPO connector 122. For example, first end 128 of the inspection tool 126 has been inserted within the port of the MPO adapter 124 to allow the ferrule of the MPO connector 122 to be received within the first end 128 of the inspection tool 126. It will be appreciated that the first end 128 of the inspection tool 126 can have a form factor that matches or is compatible with the form factor of the second port 125 of the MPO adapter 124. With the first end 128 of the inspection tool 126 inserted within the second port 125 of the MPO adapter 124, and with the camera 132 attached to the second end 130 of the inspection tool 126, light can be directed through the inspection tool 126 by the camera 132 and reflected by the inspection tool 126 across the end face of the ferrule being tested at a grazing angle relative to the end face so as to facilitate illumination of any contamination or damage provided at the end face of the ferrule. It will be appreciated that the camera 132 can view the end face of the ferrule through the inspection tool 126 and generate an image of the end face.

Figure 11A:
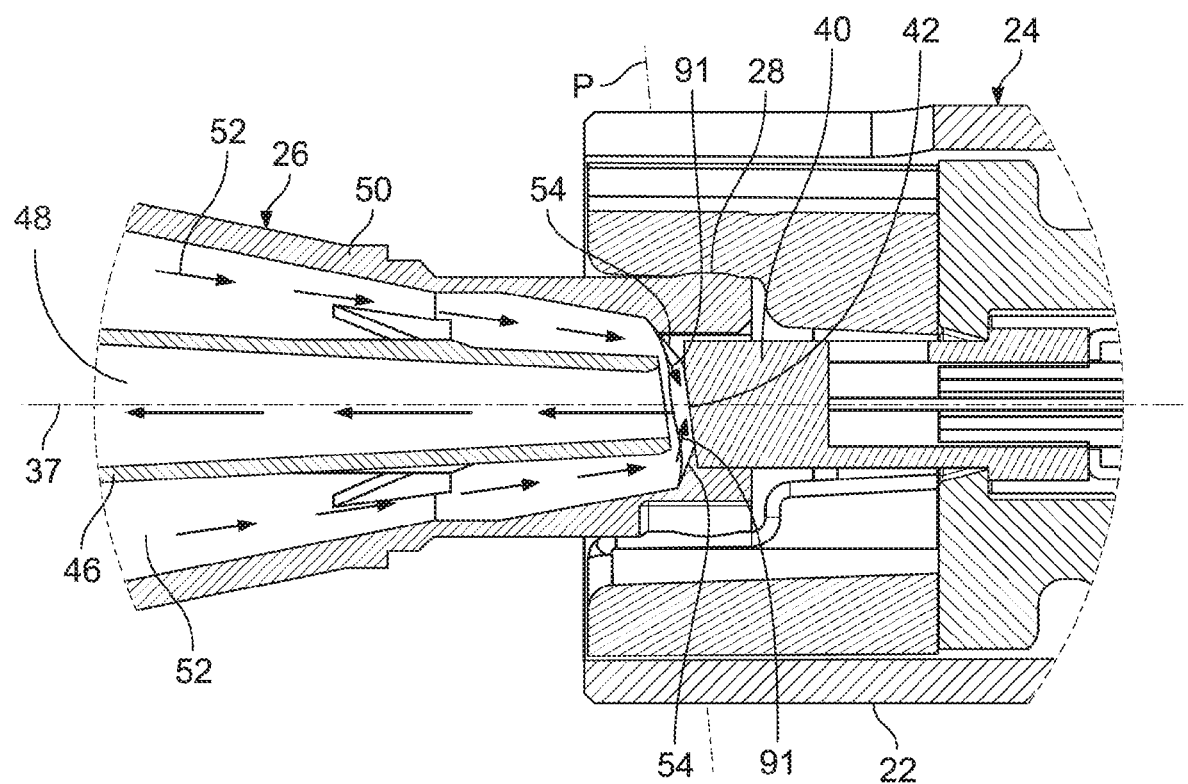
FIG. 11A is an enlarged view of a portion of FIG. 11 showing a tip of the inspection tool and also showing light being reflected by the inspection tool at a grazing angle across the face of the ferrule being inspected.

FIGS. 7-11 depict the inspection tool 26 of the inspection system 20 of FIGS. 1-3. The inspection tool 26 has a length L (see FIG. 10) that extends along the central axis 37 between the opposite first end 28 and second end 30 of the inspection tool 26. The first end 28 of the inspection tool 26 defines a ferrule receptacle 38 for receiving a fiber optic ferrule 40 (see FIGS. 11 and 11a) of the hardened female fiber optic connector 24 with an end face 42 of the fiber optic ferrule 40 facing toward the second end 30 of the inspection tool 26. When the fiber optic ferrule 40 is received within the ferrule receptacle 38, the fiber optic ferrule 40 is located within the receptacle 38 such that the end face 42 is aligned along a ferrule reference plane P.

As depicted, the inspection tool 26 is adapted for inspecting the end face of an angle polished MPO ferrule. A typical angle polished MPO ferrule has an end face that is angled a pre-determined amount (e.g., typically about 8 degrees) relative to a plane perpendicular to the central axis of the fiber optic connector. As depicted, the ferrule reference plane P is oriented at a non-perpendicular angle relative to the central axis 37 of the inspection tool 26. Preferably, the ferrule reference plane P is angled about 8 degrees relative to a plane perpendicular to the central axis 37 so as to be parallel to the end face 42 of the angle polished fiber optic ferrule 40. For inspection tools compatible with MPO ferrules that are not angle polished, the ferrule reference plane P would be perpendicular relative to the central axis 37.

As previously indicated, the second end 30 of the inspection tool 26 is adapted to mount to the camera 32 with an imaging direction 44 of the camera 32 extending toward the first end 28 of the inspection tool 26. The inspection tool 26 includes an inner conduit 46 defining an imaging passage 48 (e.g., a viewing passage) for allowing the camera 32 to image the end face 42 of the fiber optic ferrule 40 when the camera 32 is mounted at the second end 30 of the inspection tool 26 and the fiber optic ferrule 40 is received within the ferrule receptacle 38. The inspection tool 26 also includes an outer sleeve 50 positioned over the inner conduit 46. A light conveying passage 52 is positioned outwardly offset from the imaging passage 48. In one example, the light conveying passage 52 surrounds the imaging passage 48 and/or forms a ring-shaped passage around the imaging passage 48. In certain examples, the light conveying passage 52 is defined between an inner surface of the outer sleeve 50 and an outer surface of the inner conduit 46. The light conveying passage 52 is configured for directing light in a generally axial direction along the central axis 37 from the light source 36 of the camera 32 to the first end 28 of the inspection tool 26. The inspection tool 26 further includes a light reflecting surface or surfaces 54 (see FIG. 11A) at the first end 28 of the inspection tool 26 for reflecting the light from the light conveying passage 52 across the ferrule receptacle 38 in a light grazing orientation relative to the ferrule reference plane P (see arrows 91 at FIG. 11A which are representative of reflected light).

It will be appreciated that inspection tools in accordance with the principles of the present disclosure can have first ends with varying types of configurations compatible with different fiber optic connectors and/or fiber optic adapters. It will be appreciated that such inspection tools can be configured so as to be compatible with single-fiber fiber optic adapters/connectors and multi-fiber fiber optic connectors.

Figure 12:
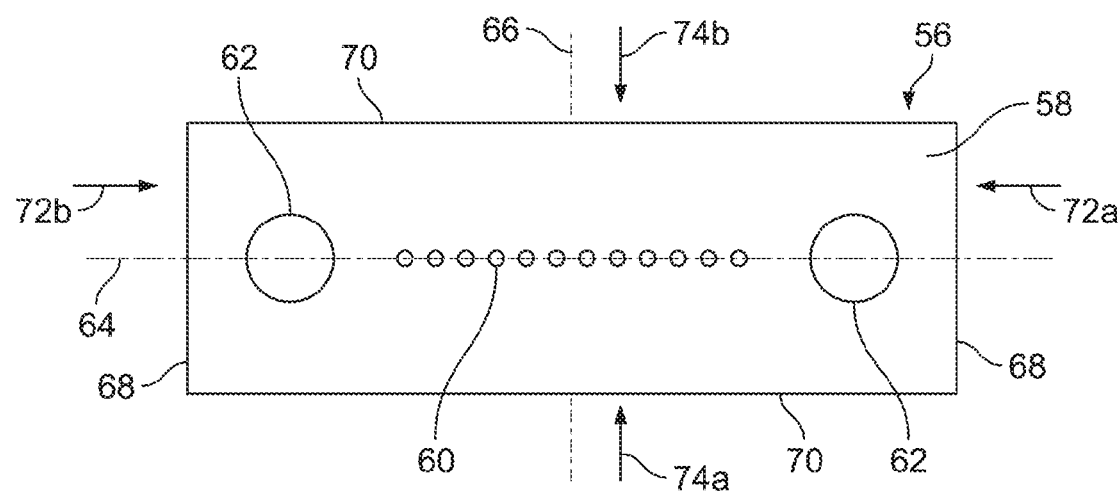
FIG. 12 shows an end face of an MPO ferrule.

FIG. 12 shows an example MPO ferrule 56 having an end face 58. The MPO ferrule 56 can include a row of optical fibers 60 positioned between a pair of alignment openings 62 for receiving alignment pins. It will be appreciated that the MPO ferrule 56 has a generally rectangular form factor including a length that extends along a major axis 64 and a width that extends along a minor axis 66. The ferrule 56 has minor sides 68 separated by the length of the ferrule 56 and major sides 70 separated by the width of the ferrule 56. As indicated above, during inspection of the end face 58 of the MPO ferrule 56 using the inspection tool 26, it is preferred for light to be directed across the end face 58 in a grazing orientation relative to the end face 58. In certain examples, the light can be reflected along major axes 64 from either or both of the minor sides 68. For example, the light can be directed in direction 72a and/or direction 72b across the end face 58 along the major axis 64. Additionally, the light can also or alternatively be reflected across the end face 58 along the minor axis 66 from either or both of the major sides 70. For example, the light can be reflected across the end face 58 in direction 74a along the minor axis 66 or in direction 74b along the minor axis 66.

Figure 13:
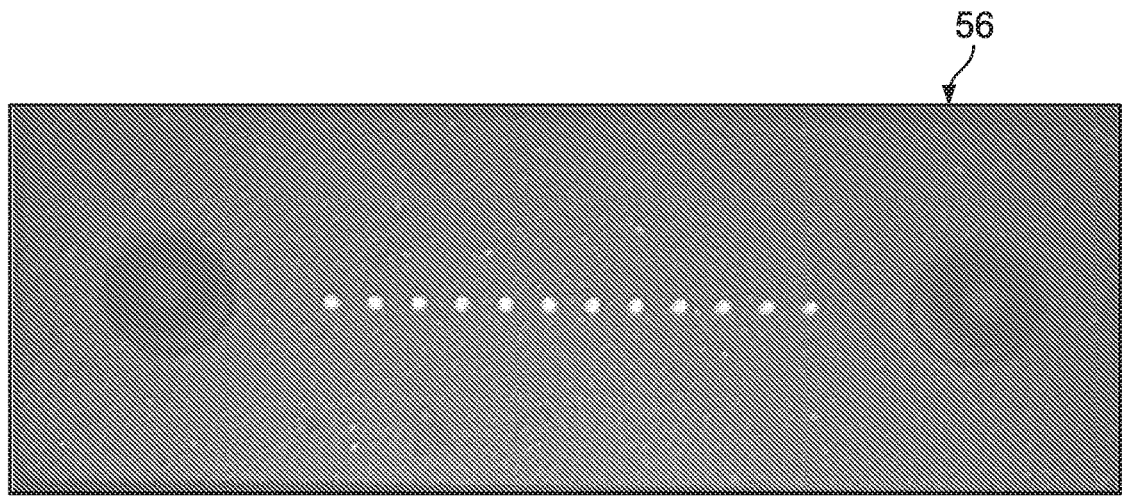
FIG. 13 shows an inspection image of an MPO ferrule where the MPO ferrule is illuminated by axial light.
Figure 14:
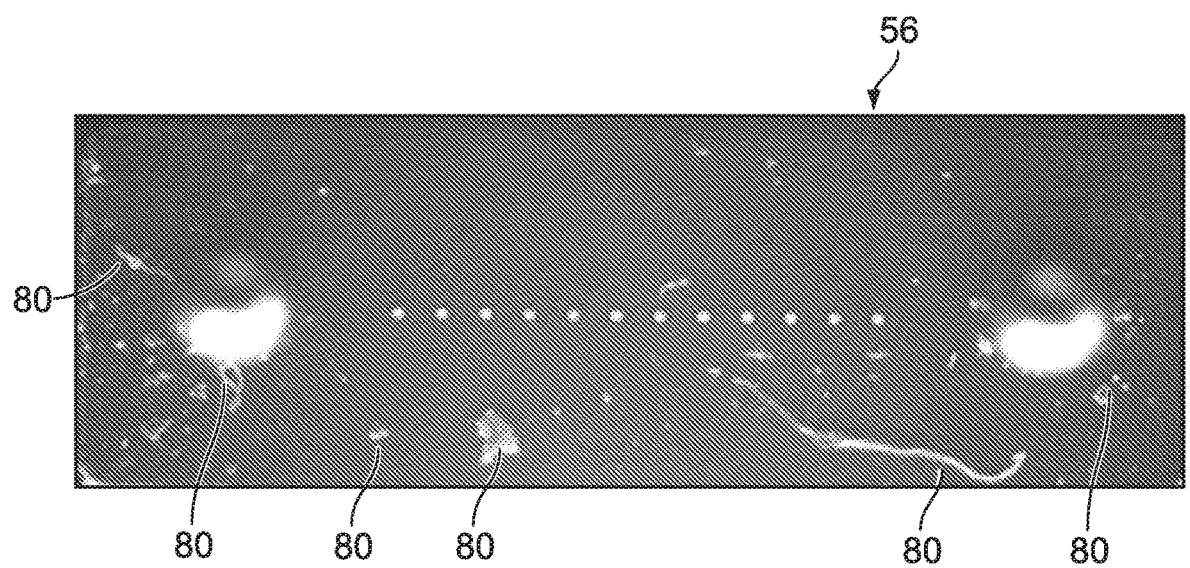
FIG. 14 is an inspection image of the same MPO ferrule of FIG. 13 with the end face of the ferrule illuminated by grazing light.

It will be appreciated that using grazing light to illuminate contamination or damage at the end face of a ferrule more effectively illuminates the contamination or damage at the end face as compared to using axial light. For example, FIG. 13 shows an image of an end face of a MPO ferrule 56 which is illuminated using axial light. In contrast, FIG. 14 shows the same end face of the MPO ferrule illuminated with grazing light. Contamination 80 is much more visible in the image of FIG. 14 as compared to the image of FIG. 13.

In certain examples, the light reflecting surface 54 or surfaces 54 are defined by the outer sleeve 50 and are positioned to overlap, align, or be intersected by the light conveying passage 52. In certain examples, the inner conduit 46 can have a first color and the outer sleeve 50 can have a second color that is more optically reflected than the first color. In one example, the first color is black and the second color is white. In certain examples, the inner conduit 46 and the outer sleeve 50 can each have a molded, plastic construction. In certain examples, the inner conduit 46 and the outer sleeve 50 can be mechanically connected by connection ribs 85 that extend radially through the light conveying passage 52. In certain examples, a first set of connection ribs 85a can be positioned generally adjacent to the first end 28 of the inspection tool 26 and a second set of connection ribs 85b can be positioned adjacent to the second end 30 of the inspection tool 26.

Figure 9:
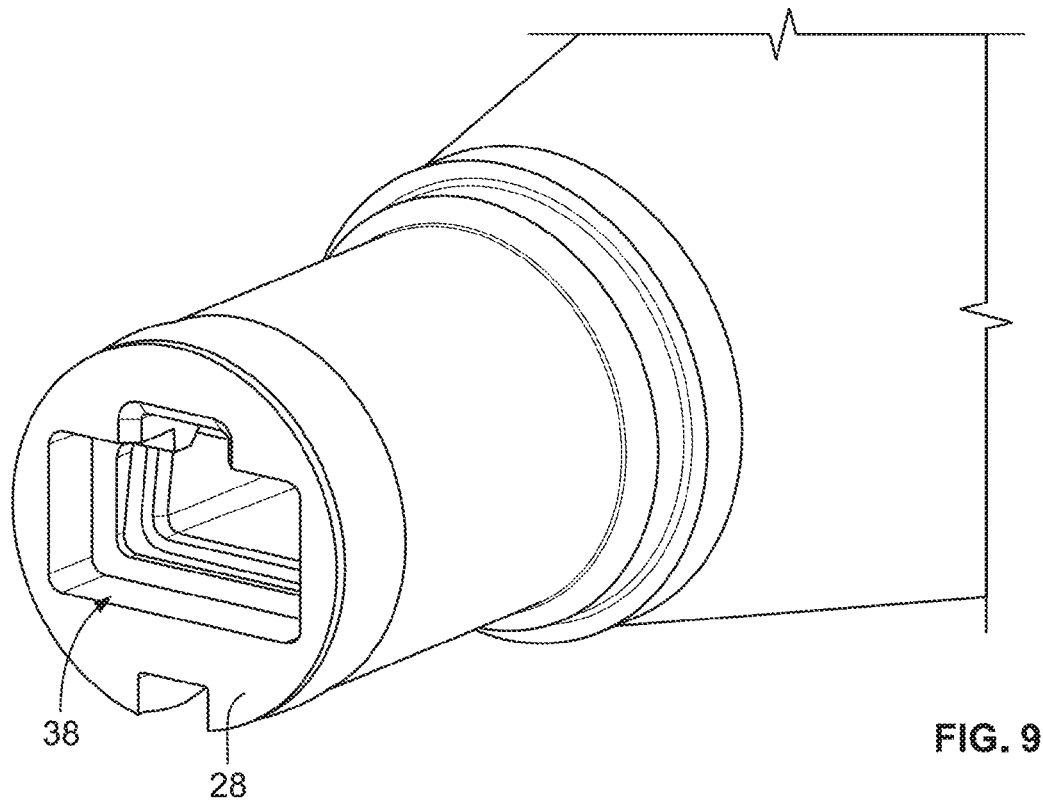
FIG. 9 is a left end view of the inspection tool of FIG. 7.
Figure 10:
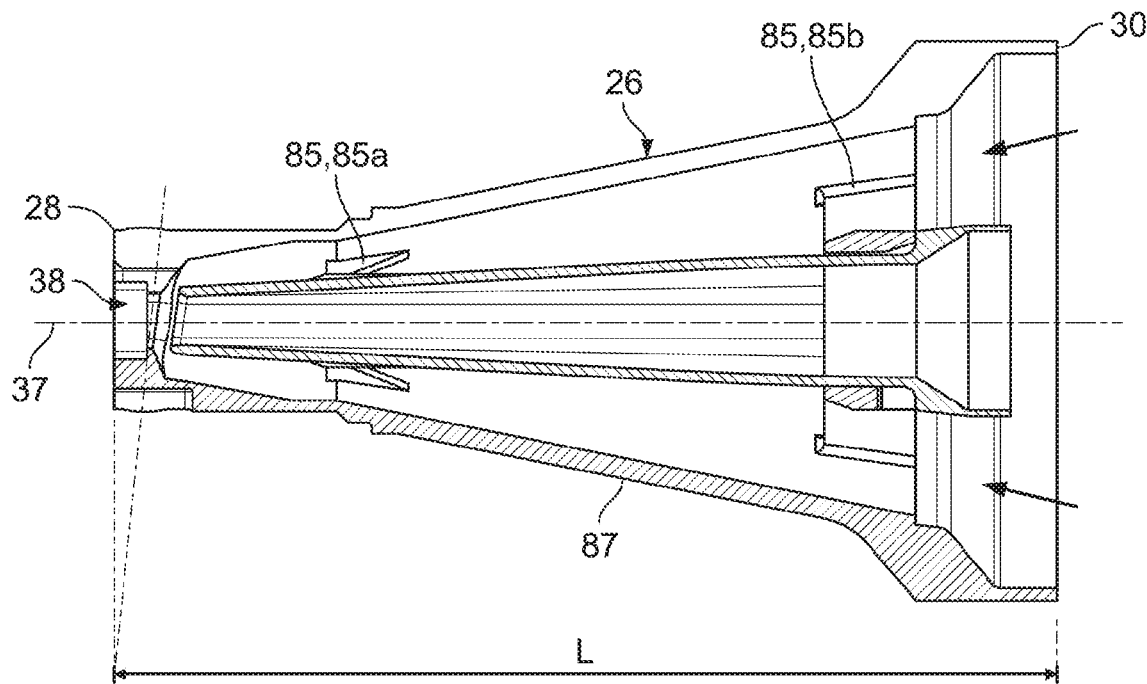
FIG. 10 is a longitudinal cross-sectional view of the inspection tool of FIG. 7.

In certain examples, as shown at FIG. 9, the first end 28 of the inspection tool 26 can have a form factor or outer shape configured to fit within a corresponding fiber optic connector such as defined by the connector body 22 of the hardened female multi-fiber fiber optic connector 24. In certain examples, the ferrule receptacle 38 is defined within the first end 28 and is rectangular and sized to receive an MPO ferrule.

In certain examples, at least a portion 87 (see FIGS. 7 and 10) of an outer profile of the inspection tool 26 tapers inwardly as the portion 87 extends in a direction to the first end 28 of the inspection tool. In certain examples, the portion 87 has a truncated, conical shape.

Figure 7:
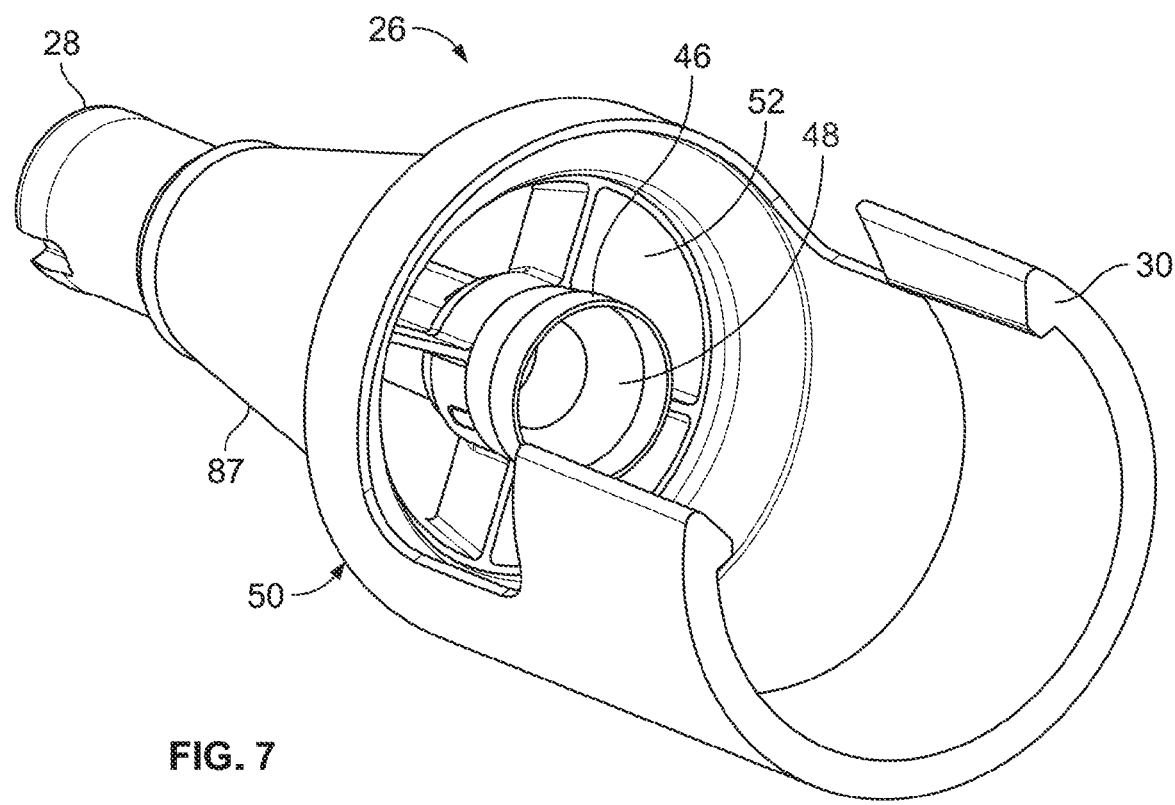
FIG. 7 is a perspective view of the inspection tool of the inspection system of FIGS. 1-3.
Figure 8:
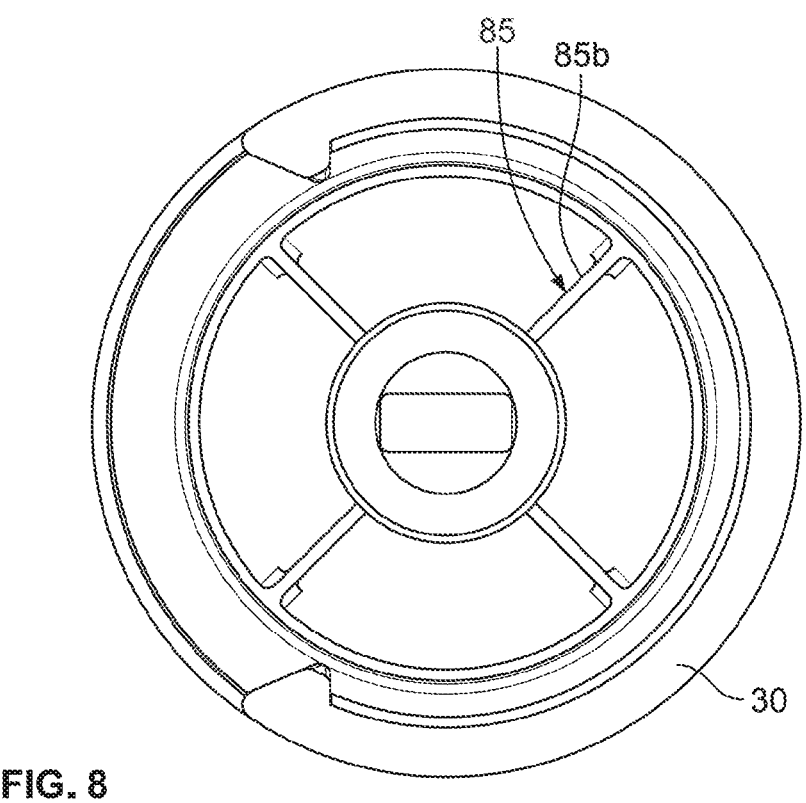
FIG. 8 is a right end view of the inspection tool of FIG. 7.

In certain examples, the second end 30 of the inspection tool 26 defines an open-sided pocket for receiving the camera 32 and for securing the camera 32 to the inspection tool 26 by a snap-fit connection. As depicted at FIGS. 7 and 8, the second end 30 of the inspection tool 26 has a c-shaped transverse cross sectional profile adapted to snap around an exterior of the camera 32.

What is claimed is:

1. An inspection system for inspecting an end face of a fiber optic ferrule for supporting one or more optical fibers, the inspection system comprising:
   a camera having a light source, the camera having an imaging direction;
   an inspection tool having a length that extends along a tool axis between opposite first and second ends of the inspection tool, the first end of the inspection tool defining a ferrule receptacle for receiving the fiber optic ferrule with the end face of the fiber optic ferrule facing toward the second end of the inspection tool and with the end face of the fiber optic ferrule defining a ferrule reference plane, the second end of the inspection tool being adapted to mount to the camera with the imaging direction extending toward the first end of the inspection tool, the inspection tool defining an imaging passage for allowing the camera to image the end face of the fiber optic ferrule when the camera is mounted at the second end of the inspection tool and the fiber optic ferrule is received within the ferrule receptacle, the inspection tool also defining a light conveying passage positioned outwardly offset from the imaging passage for directing light from the light source of the camera to the first end of the inspection tool, the inspection tool further including a light reflecting surface at the first end of the inspection tool for reflecting the light from the light conveying passage across the ferrule receptacle in a light grazing orientation relative to the ferrule reference plane.

2. The inspection system of claim 1, wherein the inspection tool includes an inner conduit which defines the imaging passage and an outer light guide sleeve positioned over the inner conduit such that the light conveying passage is defined between the inner conduit and the outer light guide sleeve.

3. The inspection system of claim 2, wherein the inner conduit and the outer light guide sleeve are connected by connection ribs that extend radially through the light conveying passage.

4. The inspection system of claim 2, wherein the inner conduit has a first color, wherein the outer light guide sleeve has a second color, and wherein the second color is more optically reflective than the first color.

5. The inspection system of claim 4, wherein the first color is black and the second color is white.

6. The inspection system of claim 2, wherein the inner conduit and the outer light guide sleeve each have a molded, plastic construction.

7. The inspection system of claim 2, wherein the outer light guide sleeve defines the light reflecting surface.

8. The inspection system of claim 1, wherein the first end of the inspection tool has a smaller profile than the second end of the inspection tool.

9. The inspection system of claim 8, wherein the second end of the inspection tool defines an open sided pocket for receiving the camera and securing the camera to the inspection tool by a snap-fit connection.

10. The inspection system of claim 8, wherein at least a portion of an outer profile of the inspection tool tapers inwardly as the portion extends in a direction toward the first end of the inspection tool.

11. The inspection system of claim 10, wherein the portion has a truncated, conical shape.

12. The inspection system of claim 1, wherein the first end of the inspection tool has a form factor adapted to be received within a fiber optic adapter or a female fiber optic connector.

13. The inspection system of claim 12, wherein the fiber optic adapter is an MPO fiber optic adapter.

14. The inspection system of claim 1, wherein the ferrule receptacle is rectangular and sized to receive an MPO ferrule.

15. An inspection system for inspecting an end face of a fiber optic ferrule for supporting one or more optical fibers, the inspection system comprising:
a camera having a camera lens aligned along a lens axis, the camera lens facing in an imaging direction, the camera also including a light source for directing light at least partially in the imaging direction; and
an inspection tool having a length that extends along a tool axis between opposite first and second ends of the inspection tool, the first end of the inspection tool defining a ferrule receptacle intersected by the tool axis for receiving the fiber optic ferrule with the end face of the fiber optic ferrule facing toward the second end of the inspection tool, the second end of the inspection tool being adapted to mount to the camera with the imaging direction extending toward the first end of the inspection tool and with the lens axis aligned with the tool axis, the inspection tool including an inner conduit defining an imaging passage that is aligned along the tool axis for allowing the camera to image the end face of the fiber optic ferrule when the camera is mounted at the second end of the inspection tool and the fiber optic ferrule is received within the ferrule receptacle, the inspection tool also including an outer sleeve secured about the inner conduit such that a light conveying passage is defined between an outer surface of the inner conduit and an inner surface of the outer sleeve, the light conveying passage being configured to convey light from the light source of the camera at the second end of the inspection tool along the tool axis to the first end of the inspection tool, the inspection tool further including a light reflecting surface at the first end of the inspection tool in alignment with the light conveying passage for reflecting the light from the light conveying passage across the end face of the fiber optic ferrule in a light grazing orientation relative to the end face of the fiber optic ferrule.

16. An inspection device comprising:
an inspection tool having a length that extends along a tool axis between opposite first and second ends of the inspection tool, the first end of the inspection tool defining a ferrule receptacle for receiving a fiber optic ferrule with an end face of the fiber optic ferrule facing toward the second end of the inspection tool and with the end face of the fiber optic ferrule defining a ferrule reference plane, the second end of the inspection tool being adapted to mount to a camera with an imaging direction of the camera extending toward the first end of the inspection tool, the inspection tool defining an imaging passage for allowing the camera to image the end face of the fiber optic ferrule when the camera is mounted at the second end of the inspection tool and the fiber optic ferrule is received within the ferrule receptacle, the inspection tool also defining a light conveying passage positioned outwardly offset from the imaging passage for directing light from a light source of the camera when the camera is mounted at the second end of the inspection tool to the first end of the inspection tool, the inspection tool further including a light reflecting surface at the first end of the inspection tool for reflecting the light from the light conveying passage across the ferrule receptacle in a light grazing orientation relative to the ferrule reference plane.

* * * * *